(12) United States Patent
Shaw

(10) Patent No.: US 7,666,269 B2
(45) Date of Patent: Feb. 23, 2010

(54) METHODS FOR EDGE-WRAPPING A PANEL

(75) Inventor: Jon B. Shaw, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 11/750,696

(22) Filed: May 18, 2007

(65) Prior Publication Data

US 2008/0286525 A1 Nov. 20, 2008

(51) Int. Cl.
*B32B 3/004* (2006.01)
(52) U.S. Cl. .................. 156/212; 156/216; 156/229
(58) Field of Classification Search ............... 29/448, 29/449
See application file for complete search history.

(56) References Cited

U.S. PATENT DOCUMENTS

| | | | | |
|---|---|---|---|---|
| 2,854,373 A | * | 9/1958 | Beach | 156/223 |
| 2,973,025 A | * | 2/1961 | Baillie et al. | 156/475 |
| 4,348,448 A | * | 9/1982 | Cornell | 428/157 |
| 5,324,384 A | | 6/1994 | Spengler | |
| 6,673,187 B2 | | 1/2004 | Nemchick et al. | |

* cited by examiner

*Primary Examiner*—Richard Crispino
*Assistant Examiner*—Barbara J. Musser
(74) *Attorney, Agent, or Firm*—Yee & Associates, P.C.; Brett L. Halperin

(57) ABSTRACT

An edge-wrapped panel and methods for edge-wrapping a panel. The panel comprises a substrate layer, a laminate layer, and at least one retainer. The laminate wraps around the substrate first edge and around the retainer first edge and sandwiches the substrate and the retainer between a first portion of the laminate and a second portion of the laminate. A method for edge-wrapping the panel includes the steps of securing the retainer to the laminate and then snap-wrapping the laminate flap around the edge of the panel. A stiffness and curvature in the retainer facilitates the swift snap-wrap movement.

14 Claims, 5 Drawing Sheets

METHODS FOR EDGE-WRAPPING A PANEL

BACKGROUND

1. Technical Field

The present disclosure relates to an edge-wrapped panel, such as an aircraft interior panel, and to methods for edge-wrapping a panel with a laminate.

2. Description of Related Art

Many aircraft interior panels are constructed of rigid or semi-rigid substrate that is covered on at least one side with a laminate. The laminate is typically decorative, and provides the panel with a pleasing outward appearance. The substrate may comprise a multilayer composite. For example, one type of substrate includes first and second outer layers of a fibrous material such as fiberglass or carbon. The outer layers may sandwich an inner layer of honeycomb core. The laminate is applied over one of the outer layers so that the panel provides a pleasing outward appearance when it is installed inside an aircraft.

One type of laminate that is commonly used today is TED-LAR®, a film or sheet made from polymers of vinyl fluoride. The laminate is molded and bonded to the substrate using a vacuum forming process. During vacuum forming, excess laminate is left around the edges of the panel. The excess is wrapped around the substrate and bonded to the back surface thereof to provide clean edges.

Edge-wrapping is commonly performed by hand using heat guns and chemicals. Workers apply glue to the back surface of the substrate, then stretch and pull the laminate around the substrate edges and secure it to the back surface. The laminate material is flexible. Therefore, the worker must pull the excess around its respective edge in stages, pulling only as much as he or she can with two hands. He or she may start at the center of one edge and work toward the ends, or start at a first end of that edge and work toward the opposite end of that edge. When the worker has pulled all portions of the excess laminate around the edge and secured it to the back surface of the substrate, he or she secures a retainer, which is typically a plastic strip, over the laminate on the panel back surface. The retainers may include features that facilitate attachment of the panel within the aircraft interior.

The hand edge-wrapping process is difficult to master, takes a long time to complete, and presents serious ergonomic issues. The stretching and pulling of the laminate, and the pressing of the laminate against the substrate back surface can cause repetitive stress injuries to hands, wrists and arms. Workers also must wear heavy gloves to insulate themselves from the heat guns and the hot laminate. Some workers also wear respirators to protect from solvent fumes.

SUMMARY

The preferred embodiments of the present edge-wrapped panel and methods for edge-wrapping a panel have several features, no single one of which is solely responsible for their desirable attributes. Without limiting the scope of this panel and these methods as expressed by the claims that follow, their more prominent features will now be discussed briefly. After considering this discussion, and particularly after reading the section entitled "Detailed Description of the Preferred Embodiments", one will understand how the features of the preferred embodiments provide advantages, which include quick and easy edge-wrapping of panels with attendant reductions in repetitive stress injuries and dangers from exposure to heat and chemicals.

One aspect of the present panel and methods includes the realization that current methods of edge-wrapping panels are slow and tedious, and therefore labor intensive and expensive. Further, these methods present serious dangers to those workers who must pull and stretch the laminates around the panel substrates. Accordingly, an improved panel and improved methods for edge-wrapping the panel would lower the cost of producing panels and increase the safety of workers.

In accordance with the above realizations, one embodiment of the present edge-wrapped panel and methods for edge-wrapping a panel comprises a method for edge-wrapping a panel with a laminate. The method comprises the step of providing a substrate having a first edge and a back surface. The method further comprises the step of positioning at least one retainer spaced from the first edge of the substrate, the at least one retainer having a back surface. The method further comprises the steps of positioning the laminate over the substrate and the at least one retainer, securing the laminate to the substrate and to the at least one retainer. The method further comprises the steps of wrapping the laminate around the first edge of the substrate to thereby bring the at least one retainer back surface into facing arrangement with the substrate back surface, and securing the at least one retainer back surface to the substrate back surface.

Another embodiment of the present edge-wrapped panel and methods for edge-wrapping a panel comprises a panel for an aircraft interior. The panel comprises a substrate layer having at least a first edge, a laminate layer, and at least one retainer having at least a first edge extending substantially parallel to the substrate first edge. The laminate wraps around the substrate first edge and around the retainer first edge and sandwiches the substrate and the retainer between a first portion of the laminate and a second portion of the laminate.

BRIEF DESCRIPTION OF THE DRAWINGS

The preferred embodiments of the present edge-wrapped panel and methods for edge-wrapping a panel will now be discussed in detail with an emphasis on highlighting the advantageous features. These embodiments depict the novel and non-obvious panel and methods shown in the accompanying drawings, which are for illustrative purposes only. These drawings include the following figures, in which like numerals indicate like parts.

DETAILED DESCRIPTION

Figure 1:
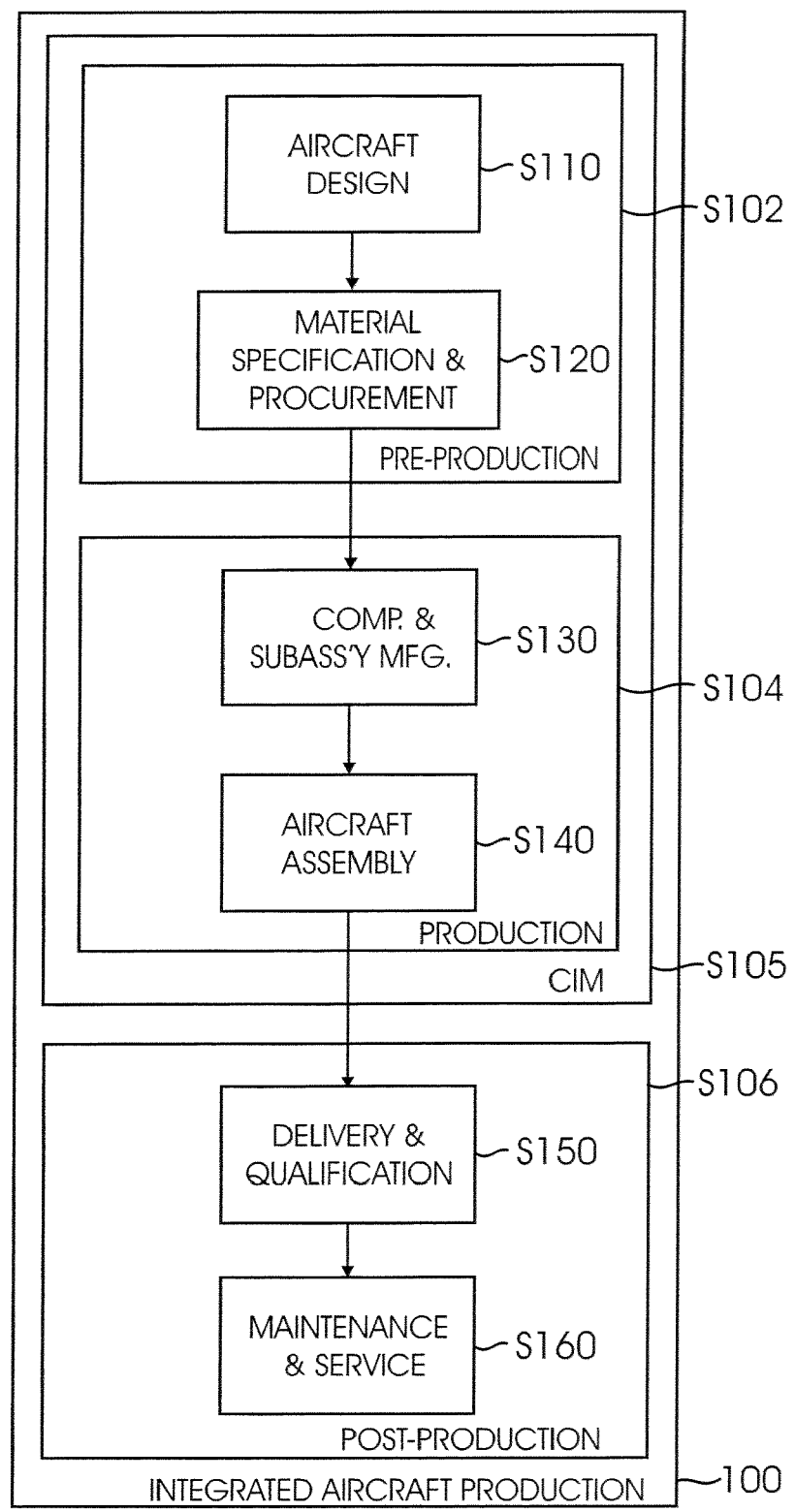
FIG. 1 is a flowchart illustrating steps in an integrated aircraft production process.

FIG. 1 illustrates an integrated aircraft production process 100, in accordance with embodiments of the present disclosure. As used herein, the integrated aircraft production process 100 also may include manufacturing, support, or both. Typically, the process 100 includes a pre-production phase S102, a production phase S104, and a post-production phase S106. The pre-production phase S102 may include aircraft design S110, including design of subassemblies and components, and material specification and procurement S120. Material specification and procurement S120 may include selection and procurement of components fabricated, or subassemblies manufactured, by third parties. Examples of such third parties include, without limitation, vendors, subcontractors, and suppliers. The production phase S104 may include component fabrication and/or subassembly manufacturing S130, and aircraft assembly S140. The pre-production phase S102 and production phase S104 can be elements of an integrated manufacturing process S105, including one or more of aircraft and component design, development, and simulation processes; material, component, and sub-assembly specification and procurement processes; automated production planning processes; fabrication and assembly processes; and quality control processes.

Frequently, aspects of a modern aircraft production process, such as the integrated process 100, do not end with final assembly, but may extend over the service life of an aircraft. These aspects may involve iterative and interactive collaborations between manufacturer, governmental authorities, customers and aircraft operators. Accordingly, the integrated production process 100 can include a post-production phase S106. The post-production phase S106 may include aircraft delivery and qualification S150, and/or aircraft maintenance and service S160. The aircraft delivery and qualification S150 may include providing an aircraft to customer specifications, which may have changed from the time the aircraft was assembled. Thus, delivery and qualification can include repair, modification, and/or revision of one or more elements of the aircraft after delivery to a customer or operator. Also, it may be desirable to perform a modification, maintenance, a repair, and/or an upgrade to an aircraft in the service interval between aircraft delivery and retirement. Therefore, aircraft maintenance and service S160 can include repair, maintenance, modification, and/or upgrade of a portion of an airframe, including an airframe manufactured or assembled using traditional, pre-existing materials, components, and/or subassemblies.

Figure 2:
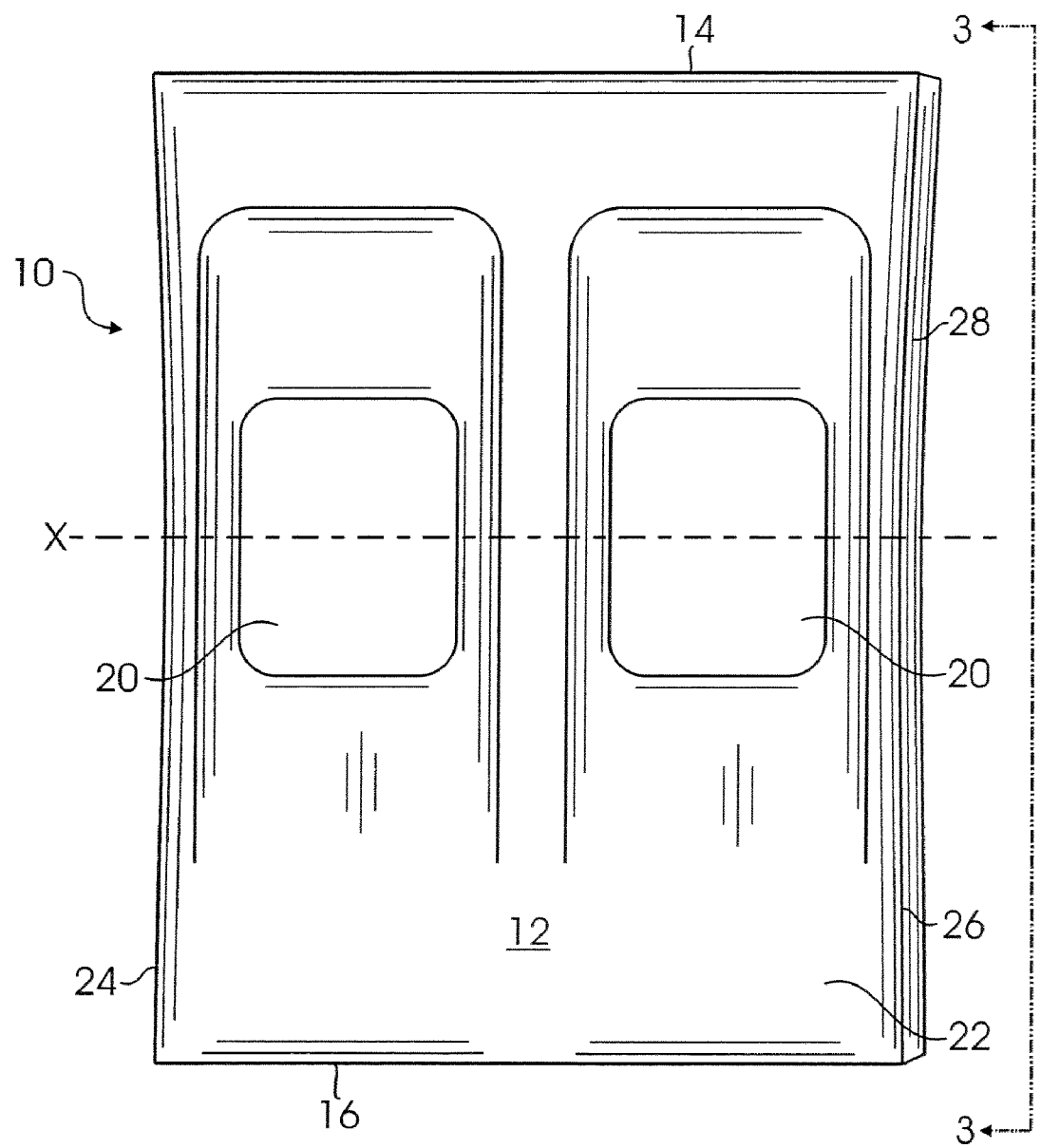
FIG. 2 is a front elevation view of an aircraft interior panel constructed in accordance with one embodiment of the present methods for edge-wrapping a panel.
Figure 3:
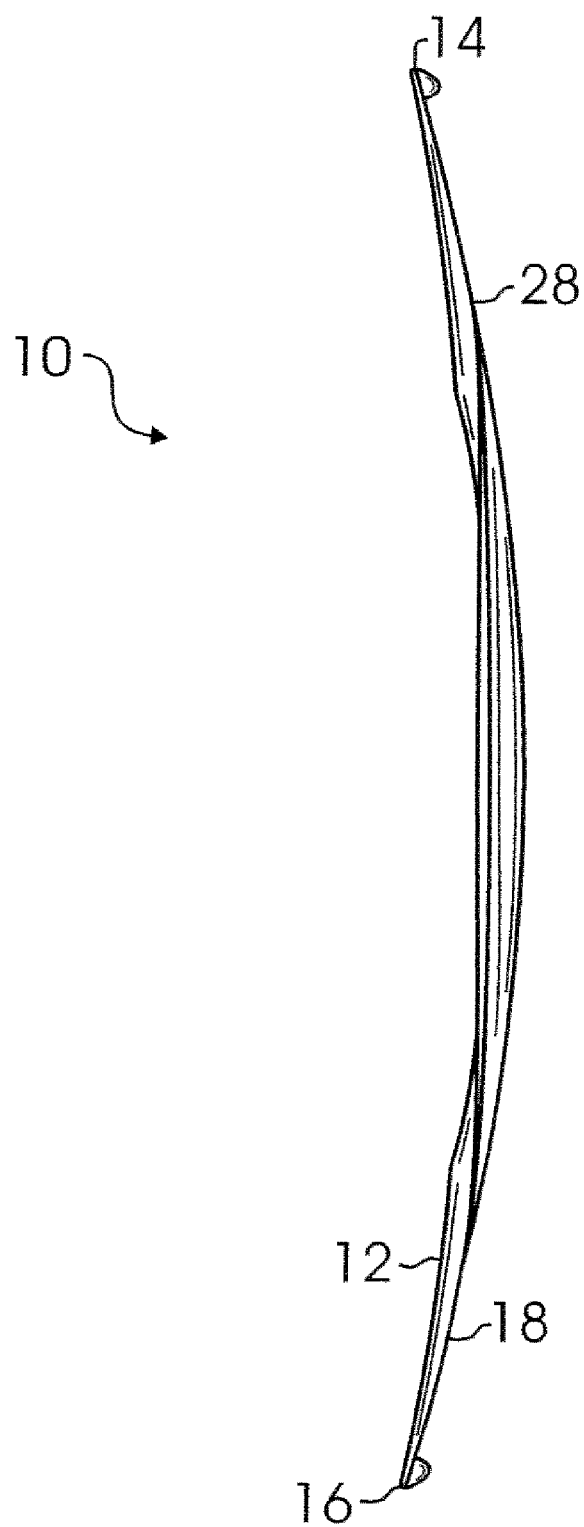
FIG. 3 is a right-side elevation view of the aircraft interior panel of FIG. 2.

FIGS. 2 and 3 illustrate an aircraft interior panel 10 constructed in accordance with one embodiment of the present methods for edge-wrapping a panel 10. With reference to FIG. 2, the panel 10 is generally rectangular in front elevation view, but includes a curvature about a first axis x that runs lengthwise along the panel, as shown in FIG. 3. The front surface 12 of the panel 10 curves inwardly from a top edge 14 to a bottom edge 16, while the rear surface 18 of the panel 10 curves outwardly. The panel 10 is adapted to be installed on the interior of an aircraft (not shown) to provide a decorative covering for the fuselage and any cables, wires, pipes, etc. extending along the fuselage. The panel 10 also includes two window openings 20 (FIG. 2). Those of ordinary skill in the art will appreciate that the panel 10 could have any of a variety of different configurations, and could be virtually any size.

FIG. 2 illustrates the panel 10 at an intermediate stage of edge-wrapping. A laminate 22 has been applied to the front surface 12 of the panel 10. The laminate may be TEDLAR® or any other suitable material. At a left edge 24 of the panel 10 excess laminate 22 has been edge-wrapped around the panel 10, leaving a clean edge with a pleasing appearance. At a right edge 26 of the panel 10 a flap 28 of excess laminate 22 remains. This flap 28 will be edge-wrapped around the panel 10 in accordance with one embodiment of the present methods, which are described in detail below.

Figure 4:
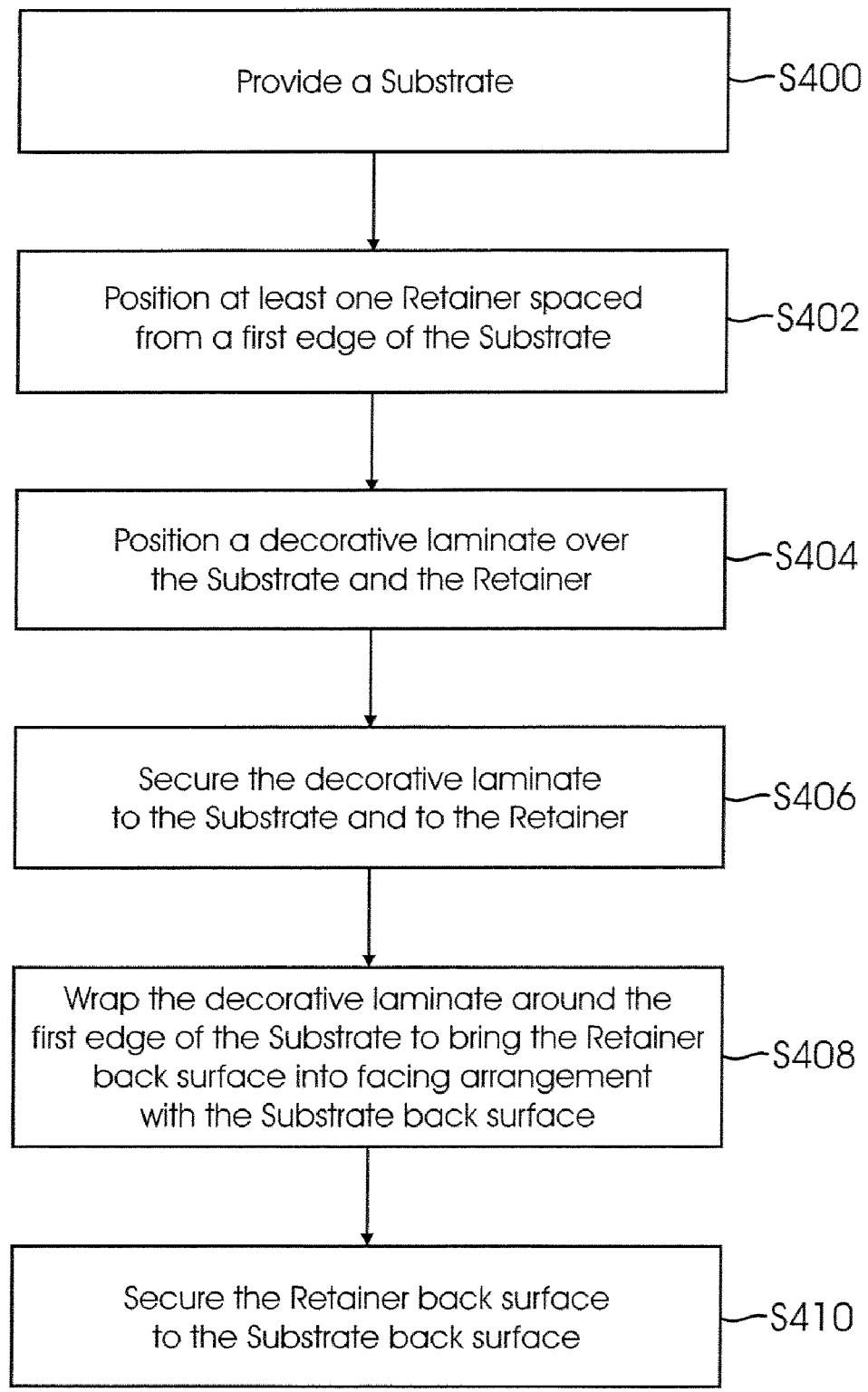
FIG. 4 is a flowchart illustrating steps in one embodiment of the present methods for edge-wrapping a panel.

FIG. 4 illustrates steps in one embodiment of the present methods for edge-wrapping a panel. FIGS. 5-8 are schematic views of the panel components used in the method of FIG. 4 as viewed from a top edge-on perspective with a front surface of the panel facing upward. For clarity, the curvature in the panel 10 has been omitted from FIGS. 5-8. However, the curvature in the panel 10, which is clearly visible in FIG. 3, contributes to the advantageous features of the present methods for edge-wrapping a panel, as described in detail below.

With reference to FIG. 4, in one embodiment of the present methods a substrate is provided, as shown at step S400. In step S402 at least one retainer is positioned adjacent the substrate and spaced from a first edge of the substrate. In certain embodiments opposite edges of the panel are edge-wrapped, and therefore in step S404 two retainers may be positioned spaced from opposite edges of the panel. In step S404 a laminate is positioned over the substrate and the retainer(s), and in step S406 the laminate is secured to the substrate and the retainer(s). In step S408 the laminate is wrapped around the first edge of the substrate to bring the back surface of the retainer(s) into facing arrangement with the substrate back surface. In step S410 the back surface of the retainer(s) is secured to the substrate back surface.

Figure 5:
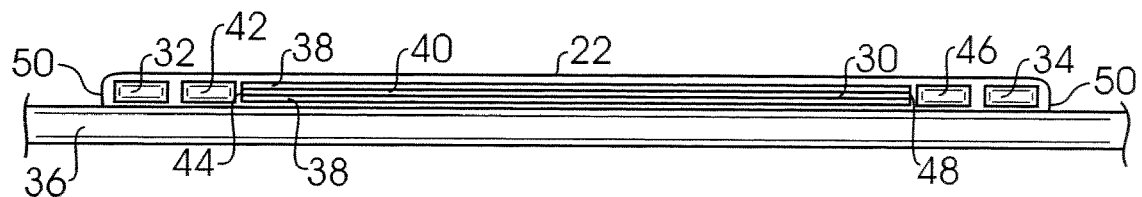
FIG. 5 is a schematic bottom view of a panel during one step of the method of FIG. 4.
Figure 6:
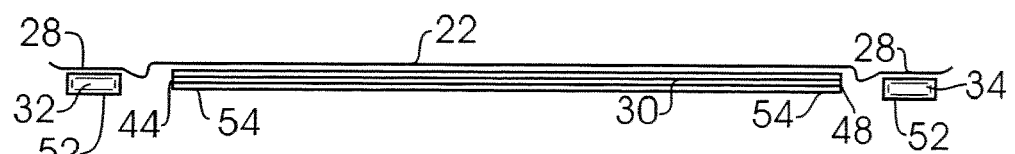
FIG. 6 is a schematic bottom view of the panel of FIG. 5 during another step of the method of FIG. 4.

FIGS. 5 and 6 further illustrate the steps S400-S410 with reference to schematic representations of the components of the panel, including a substrate 30, first and second retainers 32, 34 and a laminate 22. In FIG. 5 the components are arranged on a work surface 36, which may comprise a vacuum table, for example. However, those of ordinary skill in the art will appreciate that no work surface need be provided. In FIG. 5, spacing between adjacent components has been exaggerated for clarity. In practice the components may contact one another.

In one embodiment the substrate 30 comprises a multilayer composite including first and second outer layers 38 and at least one inner layer 40 (FIG. 5). For example, and without limitation, the outer layers 38 may comprise a fibrous material, such as fiberglass, carbon or KEVLAR®, and the inner layer 40 may comprise a material having internal cavities, such as honeycomb core. Those of ordinary skill in the art will appreciate that the substrate 30 could comprise alternative materials, and that the substrate 30 need not comprise multiple layers.

As illustrated in FIG. 5 a first spacer 42 is positioned adjacent a first edge 44 of the substrate 30 and a second spacer 46 is positioned adjacent a second edge 48 of the substrate 30 opposite the first edge 44. The first retainer 32 is positioned adjacent the first spacer 42 such that the spacer 42 is between the first retainer 32 and the substrate first edge 44. The second retainer 34 is positioned adjacent the second spacer 46 such that the spacer 46 is between the second retainer 34 and the substrate second edge 48. The laminate 22 extends over the substrate 30, spacers 42, 46 and retainers 32, 34 with overhanging portions 50 extending past each retainer 32, 34. Again, in FIG. 5 spacing between adjacent components has been exaggerated for clarity. In actual practice some or all of the components may be in contact with one another. Those of ordinary skill in the art will appreciate that the spacers 42, 46 need not be used in the present methods. The spacers 42, 46, however, help to ensure that the spacing between the substrate 30 and the retainers 32, 34 remains consistent as the method of fabricating the panel 10 is repeated.

As shown in FIG. 5, each of the retainers 32, 34 and spacers 42, 46 has a substantially rectangular cross-section. However, those of ordinary skill in the art will appreciate that these components could have cross-sections of virtually any shape. Further, relative dimensions of each component in the figures should not be interpreted as limiting. In one embodiment the retainers 32, 34 comprise elongate, relatively thin strips of a rigid or semi-rigid material, such as a polymer. In one embodiment the retainers 32, 34 are constructed of ULTEM®. The retainers 32, 34 provide additional stiffness to the portions of the laminate 22 that overhang the panel 10. The additional stiffness advantageously facilitates quick and easy edge-wrapping of the panel 10, as explained in detail below.

The spacers 42, 46 may be somewhat thicker than the retainers 32, 34, but also generally comprise elongate strips or bars of a rigid or semi-rigid material. For example, the spacers 42, 46 could be constructed of a metal or a polymer. In one embodiment a width of each spacer 42, 46 is at least equal to a sum of the thicknesses of the substrate 30 and one of the retainers 32, 34. Each spacer 42, 46 thus ensures that sufficient laminate 22 material is reserved for wrapping around each edge 44, 48 of the substrate 30 and the adjacent retainer 32, 34, as described in detail below.

In one embodiment of the present methods for edge-wrapping a panel the components illustrated in FIG. 5 are arranged on the work surface 36 as shown, but in no particular order. For example, the substrate 30 may be placed on the work surface 36 prior to the spacers 42, 46, or vice versa. After the laminate 22 is placed over the components it is secured to the substrate 30 and the retainers 32, 34. Alternatively, the laminate 22 may be secured to the substrate 30 prior to placing the substrate 30 and the laminate 22 on the work surface 36. The laminate 22 may be secured to the substrate 30 and the retainers 32, 34 using adhesive, heat sealing, ultrasonic or megasonic welding, or other securement techniques.

The laminate 22 is not secured to the spacers 42, 46, at least not permanently. If the spacers 42, 46 are left on the work surface 36 during the securing step, the laminate 22 may be temporarily secured to the spacers 42, 46. However, the spacers 42, 46 are subsequently detached from the laminate 22 in the event that any adherence occurs. In one embodiment the spacers 42, 46 are constructed of a material that does not bond to the laminate 22 material so that no adherence occurs. Alternatively, the spacers 42, 46 may be removed from the work surface 36 before the laminate 22 is secured to the substrate 30 and to the retainers 32, 34.

Figure 7:
FIG. 7 is a schematic bottom view of the panel of FIG. 5 during another step of the method of FIG. 4.
Figure 8:
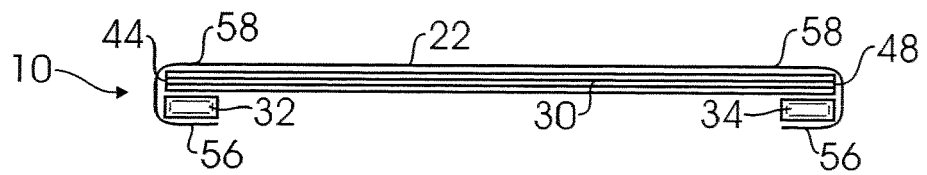
FIG. 8 is a schematic bottom view of the panel of FIG. 5 during another step of the method of FIG. 4.

FIG. 6 illustrates the panel 10 as it appears in an intermediate step of one embodiment of the present methods, after the laminate 22 has been secured to the substrate 30 and to the retainers 32, 34 and after the spacers 42, 46 have been removed. Again, in these figures spacing appears between the laminate 22 and the substrate 30, and between the laminate 22 and the retainers, even though the laminate 22 is secured to these components. In FIGS. 6-8 the work surface 36 has been omitted for clarity. Those of ordinary skill in the art will appreciate that all steps in the embodiments of the present methods may be carried out on a work surface or without a work surface.

With reference to FIG. 6, the retainers 32, 34 are secured to respective flaps 28 of the laminate 22 that overhang the edges 44, 48 of the substrate 30. An adhesive layer (not shown) may be applied to a back surface 52 of the retainers 32, 34. Alternatively, or in addition, an adhesive layer (not shown) may be applied to a back surface 54 of the substrate 30 near the first and second edges 44, 48. The adhesive may be, for example, double-sided tape, glue or any other adhesive. The adhesive may further be applied to the retainers 32, 34 and or to the substrate 30 prior to the step of assembling the panel 10 components (FIG. 5). It is advantageous, however, if the adhesive does not cause the retainers 32, 34 and/or the substrate 30 to stick to the work surface 36. In one embodiment the back surface 52 of each retainer 32, 34 includes a strip of double-sided tape with a backing (not shown). After the laminate 22 is secured to the substrate 30 and the retainers 32, 34 the backing is removed from the double-sided tape to expose the adhesive surface.

With reference to FIGS. 7 and 8, any excess laminate 22 may be trimmed from the edges 44, 48 of the retainers, and the laminate 22 is then folded around the edges 44, 48 of the substrate 30. During the folding steps each flap 28 "snaps" around its respective edge 44, 48 in one rapid motion so that the retainer back surface 52 quickly comes into facing contact with the substrate back surface 54. The "snap-wrap" effect results from the stiffness and curvature (FIG. 3) of the flaps 28. As described earlier, the retainers 32, 34 impart stiffness to the flaps 28 overhanging the edges 44, 48 of the substrate 30. In addition, the retainers 32, 34 and flaps 28 extend along side edges 44, 48 of the substrate 30, which arch about the first lengthwise axis from the top edge 14 of the panel 10 to the bottom edge 16 thereof (FIG. 3). The curvature of the retainers 32, 34 about the lengthwise axis imparts additional stiffness so that the retainers 32, 34 are more resistant to bending around the side edges 44, 48 of the substrate 30. Thus, as each flap 28 is bent it initially offers strong resistance to being folded about its respective edge 44, 48. The resistance increases as the flap 28 is bent further until a threshold is reached. At the threshold the forces acting on the flap 28 are in equilibrium, but as further bending force is applied the forces tending to prevent the flap 28 from further bending quickly dissipate and the flap 28 snaps around its respective edge 44, 48. The snapping effect quickly brings the retainer back surface 52 into facing contact with the substrate back surface 54.

In some embodiments, adhesive is applied to the retainers 32, 34 and/or the substrate 30 back surface prior to snapping the flaps 28 around the edges 44, 48. Thus, when the retainer back surface 52 snaps into contact with the substrate back surface 54, the adhesive bonds the retainers 32, 34 and the substrate 30 to one another, thereby quickly completing the edge-wrapping procedure. The adhesive may be double-sided tape, for example, and an operator may perform a step of removing a backing from the tape prior to snapping the retainers 32, 34 around the substrate 30.

Those of ordinary skill in the art will appreciate that the retainers 32, 34 may be secured to the substrate 30 using other techniques, such as heat sealing, ultrasonic or megasonic welding, etc. When using such securing techniques, adhesive might not be applied to the retainers 32, 34 and/or the substrate 30. Thus, when the retainers 32, 34 are snapped around the substrate edges 44, 48 the components will not instantly bond to one another. Nevertheless, the snapping action of the retainers 32, 34 and flaps 28 quickly brings the retainers 32, 34 into facing contact with the substrate back surface 54, and the stiffness and curvature of the flaps 28 holds the retainers 32, 34 against the substrate 30, facilitating the process of securing the retainers 32, 34 to the substrate back surface 54.

The steps of folding the flaps 28 about the edges 44, 48 may be performed by hand. For example, an operator may flip the panel 10 over on the work surface 36 so that its rear surface 18 faces upward. Alternatively, the operator may stand the panel 10 up with its top edge 14 or bottom edge 16 resting on the floor. He or she may then grasp the top edge 14 or bottom edge 16 with one hand and fold each of the flaps 28 over their respective edges 44, 48 with his or her opposite hand.

The present method advantageously eliminates the need to perform the tedious prior art edge-wrapping process described above. In that method the operator must pull the laminate flaps by hand, step-by-step, and stretch them around the substrate edges to secure them to the back surface of the substrate. The process is slow and tedious, and can cause repetitive stress injuries. It also presents other dangers to the workers, such as those from heat guns and chemical solvents. The present snap-wrap eliminates the tedious pulling and stretching. The time that it takes to complete a panel is thus reduced, which in turn reduces the cost. The present methods increase repeatability and decrease rework. Further, in embodiments where adhesive tape is used to secure the retainers to the substrate, the dangers from heat guns and chemical solvents are also eliminated.

With reference to FIG. 8, the laminate 22 wraps around the substrate edges 44, 48 and around the retainers 32, 34, sandwiching the substrate 30 and the retainers between first portions 56 of the laminate 22 and a second portion 58 of the laminate 22. A spacing between the substrate 30 and each retainer 32, 34 during the step shown in FIG. 5 determines the location of the retainer on the substrate back surface 54. For example, if the spacing between the substrate 30 and the retainer 32, 34 is exactly equal to the sum of the thicknesses of the substrate 30 and the retainer 32, 34, then the substrate edges 44, 48 and the retainers 32, 34 will be flush with one another as shown in FIG. 8. If, however, the spacing between the substrate 30 and the retainers 32, 34 is greater than the sum of the thicknesses, then the substrate 30 will overhang the retainers 32, 34.

The above description presents the best mode contemplated for carrying out the present edge-wrapped panel and methods for edge-wrapping a panel, and of the manner and process of making the panel and practicing the methods, in such full, clear, concise, and exact terms as to enable any person skilled in the art to which it pertains to make and use this panel and to practice these methods. This panel and these methods are, however, susceptible to modifications and alternate constructions from that discussed above that are fully equivalent. Consequently, this panel and these methods are not limited to the particular embodiments disclosed. On the contrary, this panel and these methods cover all modifications and alternate constructions coming within the spirit and scope of the panel and methods as generally expressed by the following claims, which particularly point out and distinctly claim the subject matter of the panel and methods.

What is claimed is:

1. A method for edge-wrapping a panel with a laminate, the method comprising the steps of:

positioning a substrate in a work area, the substrate having a first edge, a front surface having a concave curvature about a first axis that extends perpendicularly to the first edge, and a back surface having a convex curvature about the first axis;

positioning at least one retainer spaced from the first edge of the substrate, the at least one retainer having a front surface having a concave curvature about the first axis, and a back surface having a convex curvature about the first axis;

positioning the laminate over the substrate and the at least one retainer;

securing the laminate to the substrate and to the at least one retainer;

wrapping the laminate around the first edge of the substrate to thereby bring the at least one retainer back surface into facing arrangement with the substrate back surface, as the laminate is wrapped around the first edge, the curved retainer initially resists wrapping and resistance offered by the curved retainer increases until a threshold is reached after which the curved retainer quickly snaps around the first edge, and after the curved retainer snaps around the first edge the front surface of the curved retainer has a convex curvature about the first axis and the back surface of the curved retainer has a concave curvature about the first axis; and securing the at least one retainer back surface to the substrate back surface.

2. The method of claim 1, further comprising the step of positioning the substrate on a work surface.

3. The method of claim 1, further comprising the step of positioning at least one spacer between the retainer and the substrate first edge.

4. The method of claim 3, further comprising the steps of temporarily securing the laminate to the spacer and subsequently detaching the spacer from the laminate.

5. The method of claim 1, wherein the substrate comprises a plurality of layers.

6. The method of claim 5, wherein the substrate comprises a first outer layer, a second outer layer and at least a first inner layer.

7. The method of claim 6, wherein the outer layers comprise a fibrous material and the inner layer comprises a honeycomb core.

8. The method of claim 1, wherein the retainer comprises an elongate, thin strip of a rigid or semi-rigid material.

9. The method of claim 1, wherein the curvature of the retainer about the first axis increases a resistance of the retainer to being wrapped about the first edge as compared to a retainer having no curvature.

10. The method of claim 1, further comprising the steps of selecting and procuring materials.

11. The method of claim 1, further comprising the step of fabricating the substrate.

12. The method of claim 11, further comprising the step of laminating first and second outer layers and at least one inner layer.

13. The method of claim 1, further comprising the step of installing the panel within an aircraft interior.

14. The method of claim 13, wherein the panel is installed within the aircraft interior during a repair or improvement process.

* * * * *